Figure 1:
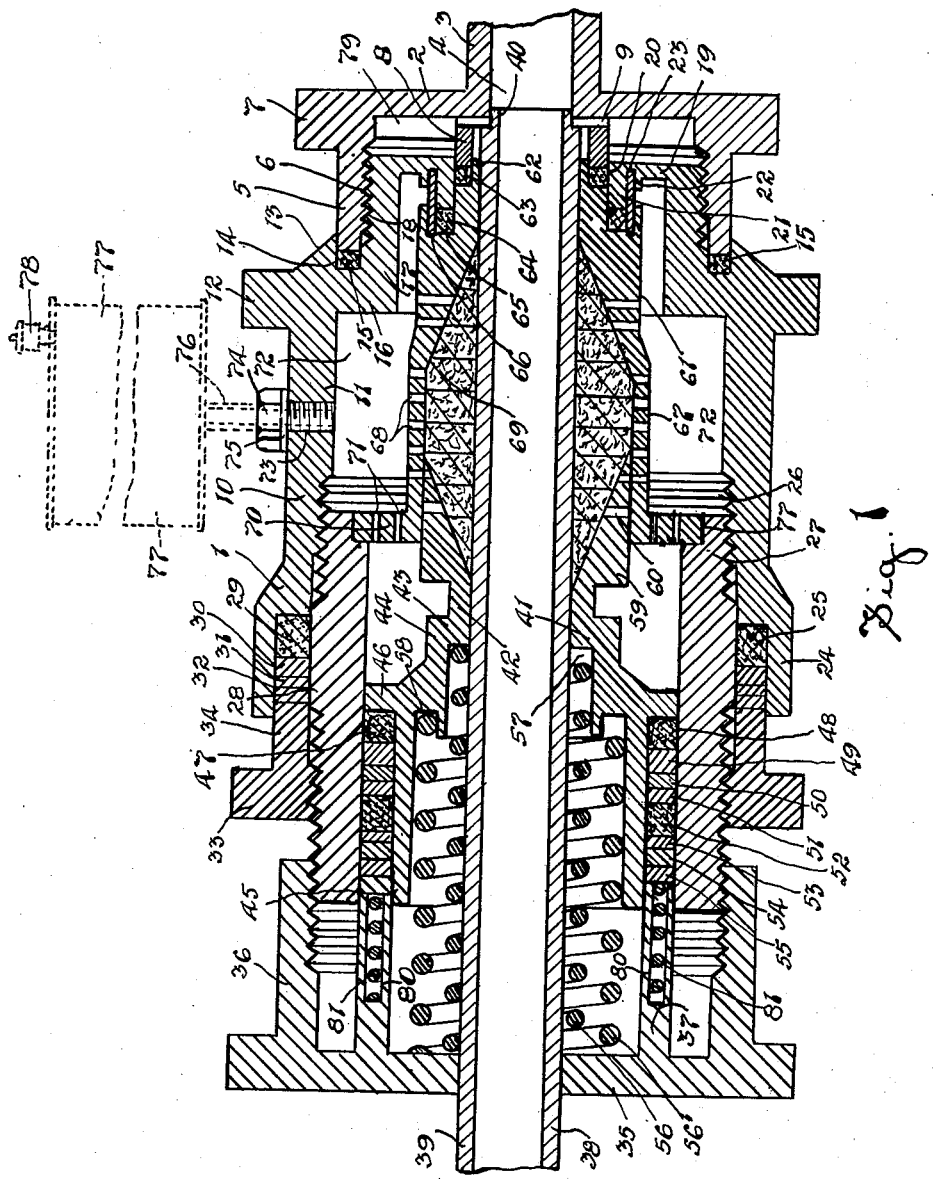

Oct. 1, 1940.    J. J. BETZOLD    2,216,107
STUFFING BOX
Filed March 4, 1938

Inventor
J. J. Betzold
By G. S. Roxburgh
His Atty

Patented Oct. 1, 1940

2,216,107

UNITED STATES PATENT OFFICE 2,216,107

STUFFING BOX

John Joseph Betzold, Winnipeg, Manitoba, Canada

Application March 4, 1938, Serial No. 193,903
In Canada March 8, 1937

1 Claim. (Cl. 286—28)

This invention relates to improvements in stuffing boxes, stuffing boxes being devices used as supports and housings for rotating or reciprocating shafts. In this capacity, stuffing boxes are called upon to supply the necessary lubricating medium to the shafts they support, and occasionally, as in the case of marine equipment, a stuffing box would also have to prevent the entry of water and water vapor.

Existing stuffing boxes, due to their present day construction, permit the leakage of oil, and as they become worn from use, this condition becomes worse requiring frequent refilling with oil, and constant attention. Furthermore, the packing in these boxes is held in such a manner that the rotation of the shaft causes the said packing to work away from the shaft and produce an inefficient lubricating condition. The existing stuffing boxes also lack means for automatic maintenance of pressure of the packing against the shaft. They lack means for applying such pressure constantly, and means for adjusting this pressure in the event of wear of the various parts.

This invention embodies principles whereby the above mentioned difficulties may be overcome, and consists chiefly of the introduction of a movable piston in the stuffing box. This piston is held tightly at all times against the packing by means of springs, and presses on the packing at an angle to the shaft. Provision is also made for an ample oil supply, proper gasket arrangement, and means for rapid adjustment of pressure against the shaft. The proper gasket arrangement as provided in this invention will prevent considerable leakage of oil, and no reoiling will be required for great lengths of time, particularly so, considering the ample oil supply as provided by the oil chambers. The pressure on the piston by the springs causing the piston to press on the packing, will be transmitted in such manner as to cause resultant pressure of the packing against the rotating or reciprocating shaft. The spring action will keep this pressure constant and will automatically take up any slack between the packing and the shaft. After considerable wear additional pressure can be applied by tightening up of the various members of the casing which are held together by screw threads.

In the description of the invention reference will be made to the accompanying drawing in which:

The single figure shows a longitudinal section through the stuffing box with a section of a hollow shaft in the box but not entirely through the box. This drawing can also apply to solid shafts, and to shafts going right through the box.

This embodiment consists of a casing 1 composed of a rear end plate 2 having a stationary conduit 3 protruding from a central orifice 4 therein. This conduit may, if desired, be threaded at its outer end for attachment to a further stationary conduit. Extending forwardly from the plate 2 is a short cylinder 5 which is internally threaded as at 6. An outstanding flange 7 encircles the plate 2 and is of hexagonal configuration, being designed to receive the jaws of a wrench.

Adjacent the orifice 4 within the plate 2 is a short forwardly extending flange 8 with a number of passageways 9 extending radially therethrough for a purpose presently to be explained.

The second portion 10 of my casing 1 is composed of a hollow cylinder 11 having an encircling flange 12 in the form of a hexagonal nut similar to the flange 7 to receive a wrench. From the rear side of the flange 12 extends a further flange 13 having a bevelled configuration and being provided with an undercut recess 14 thereunderneath. Within the recess 14, I place a leather packing ring 15 and the cylinder 5 is designed to pass beneath the edge of the flange 13 and bear against the ring 15 to prevent seeping of liquid at this junction point.

Immediately beneath the flange 12 is an inner annular ring 16 to which is attached a rearwardly extending cylinder 17 which is externally threaded as at 18 to engage with the threads 6 upon the cylinder 5. A further ring 19 with a central orifice 20 is attached to the rear end of the cylinder 17 and is provided adjacent this orifice with a forwardly extending annulus 21 of the configuration illustrated. A small encircling flange 22 also protrudes from the ring 19 and provides an annular slot 23 between the rings 21 and 22.

Integrally attached to the forward end of the cylinder 11 is a circular portion 24 of greater diameter than the cylinder 11, which is undercut to provide a circular recess 25.

The forward portion of the cylinder 11 is internally threaded as at 26 to receive a sleeve 27. This sleeve is externally threaded for the greater portion of its length but has an encircling flat ring 28, whose outer diameter is greater than the diameter of the crowns of the threads upon the sleeve.

The outer periphery of this ring is designed to form the inner wall of the recess 25 and into this recess are placed packing rings, the rear ring 29 being of leather, the adjacent ring 30 of iron, the ring 31 of soft lead and a further ring 32 of iron similar to the ring 30. These packing rings are all firmly compressed within the recess 25 by means of a nut 33 threadably received upon the sleeve 27 and having an annular flange 34 which is designed to pass within the end of the recess 25 and engage with the outermost ring 32.

Closing the forward end of the stuffing box is a front end plate 35 provided with an internally threaded cylindrical portion 36, the threads of which are received upon the sleeve 27, and also a concentric inner flange 37, the outer periphery of which engages with the inner surface of the sleeve 27. The center of the front end plate is drilled to provide a bearing 38 therein to receive a hollow or solid rotating or reciprocating shaft 39. In the case of a hollow shaft, as illustrated, it would extend through the stuffing box and the diameter thereof would reduce as at 40 in order that it may fit within the internal walls of the conduit 3. A solid shaft would of course extend completely through the device.

Encompassing the shaft 39 is a slidable compression member 41. This member engages with the shaft along the inner surface of a short sleeve portion 42 to which is attached by means of an annular portion 43, a further cylinder 44 of larger diameter than the cylinder 42. A further cylinder 45 of still greater diameter than the cylinder 44 extends forwardly from the cylinder 44. The forward outer surface of this cylinder engages with the inner periphery of the flange 37 and is provided at its root with an integral collar 46 which engages with the inner surface of the sleeve 27.

The cylinder 45 together with the sleeve 27 and flange 44 bound a recess 47 into which is inserted a series of packing rings, the rear ring 48 being composed of leather, the adjacent ring 49 of iron and the succeeding rings 50, 51, 52, 53, 54 and 55 of lead, iron, leather, iron, lead and iron respectively. These packing rings are maintained in a tightly compressed condition within the recess 47 by means of the flange 37 which fits into the end of the recess and bears against the packing ring 55.

Encircling the shaft 39 and extending between the front end plate 35 and the member 42 is a stiff helical spring 56. This spring it will be noted, extends into the recess 57 formed by the ring 43 and the cylinder 44. Further spring 56' is also provided extending between the plate 35 and the member 42, this spring being of greater diameter than the spring 56 and is received within a further annular recess 58 within the member 42.

Extending rearwardly from the shaft contacting portion of the member 42, is an integral portion 59 having a cylindrical outer configuration but being bevelled within and provided with a plurality of orifices 60 passing therethrough for a purpose to be explained.

A cage 61 is provided within the casing and encircles the shaft 39 adjacent the point at which it meets the stationary conduit 3. This member has a ring 62 around which is passed a lead gasket 63 held in compression by the flange 8. A further leather washer 64 of the configuration illustrated is placed within the recess 65 and is compressed by the ring 21.

Adjacent this washer is a deep encircling slot 66 opposing the slot 23 and a soft lead gasket is placed within this slot and is compressed therein to effectively seal the joint and prevent seepage of any liquid or fluid therethrough. The cage 61 extends forwardly and upwardly and has an internally bevelled portion oppositely formed to the bevelled portion within the member 42.

A cylindrical portion 67 extends forwardly and overlaps the periphery of the concentric cylindrical portion 59. The portion 67 is also provided with a number of orifices 68 passing therethrough and within the chamber formed by the sleeve and the member 42 and cage 61 are placed a number of packing rings 69 of leather, compressed cotton or other suitable material. Due to the pressure of the springs and the bevelled configuration of the members 42 and 61, these packing rings are pressed firmly against the shaft 39 and prevent any liquid seeping therealong.

An encircling flange 70 having orifices 71 therein, is made integral with the end of the cylinder portion 67 and is received within an annular recess 77 within the sleeve 27.

In order to successfully lubricate the shaft 39, I fill the chamber 72 around the members 42 and 61 with oil which flows through the passageways 60 and 68 and seeps through the leather packing 69 until it reaches the shaft.

It will be noted that I have not provided any oil passageways near the outer ends of the packing in order to preserve the oil and prevent a surplus thereof from being admitted to the shaft. The oil I introduce into the chamber through a threaded orifice 73 which is normally kept closed by means of a screw plug 74 which has a gasket 75 interposed between the head and the casing of the stuffing box.

If it be desired to increase the volume of the oil and to apply pressure to said oil, this can be done by substituting the parts shown in dotted outline, for the screw plug and gasket, such parts embodying a feed pipe 76 leading from a pressure tank, 77, and a suitable removable valve 78. This latter valve will allow of the introduction of the oil and of the admittance of air under pressure to the tank. One can obviously bring the air to any desired pressure in the tank and this will serve to forcibly feed the oil to the various parts of the stuffing box.

It will also be noted that the passageways 40 adjacent the junction points of the rotating and stationary shafts are for the purpose of allowing a portion of the fluid which is passing through the shafts to seep into the chamber 79 and thereby help to cool the stuffing box in warm weather and warm it in cool weather.

Under conditions where there may be high temperature steam, under pressure, such as in locomotive use, it would be desirable to have the last packing ring 69, at the right hand of the box, made from Babbitt-metal or any other suitable metallic compound which will withstand wear and tear.

In order to automatically and positively take up any slack in the series of packings 48, 49, 50, 51, 52, 53, 54 and 55 which might occur through wear, I have made an annular recess 80 in the flange 37 and have placed a coiled spring 81 in the recess which bears against the packing 55 and continuously maintains the said rings in compression as will be readily understood.

I might also mention that where the plug 74 is used, one can bring the oil in the chamber 72 under pressure by introducing compressed air into the chamber in any well known manner.

When oil is used under pressure, it is forced through the packing 69 to the shaft to be lubricated and it also acts to force the packing towards the shaft.

What I claim as my invention is:

Improvements in stuffing boxes, comprising in combination with a shaft and a containing case, a member mounted on the shaft and bearing against and forming an oil tight joint with one end of the casing and provided with an integrally formed frusto-conical interior portion and a cylindrical portion extending from the latter and spaced from the shaft and the casing, said portions being perforated, a non-metallic packing material between said portions and said shaft, a compression member mounted on the shaft and telescoped within the cylindrical portion aforesaid and presenting a frusto-conical interior face engaging with the packing material, said compression member making an oil tight joint with the casing and enclosing an oil chamber surrounding the cylindrical portion aforesaid, resilient means for maintaining said compression member in engagement with said packing material and means for admitting a fluid under pressure to said oil receiving chamber.

JOHN JOSEPH BETZOLD.